(12) United States Patent
Fullerton et al.

(10) Patent No.: US 8,810,480 B2
(45) Date of Patent: Aug. 19, 2014

(54) METHODS AND APPARATUSES FOR CONTROLLING DISPLAY DEVICES

(75) Inventors: Guy Fullerton, San Jose, CA (US); Ralph T. Brunner, Cupertino, CA (US); Ali Ozer, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1447 days.

(21) Appl. No.: 11/499,047

(22) Filed: Aug. 4, 2006

(65) Prior Publication Data

US 2008/0030425 A1    Feb. 7, 2008

(51) Int. Cl.
*G09G 5/12* (2006.01)

(52) U.S. Cl.
USPC ............................................ 345/3.3; 715/761

(58) Field of Classification Search
USPC .................. 345/1.1, 1.2–3.4, 4, 660, 698; 715/759–815
See application file for complete search history.

(56) References Cited

U.S. PATENT DOCUMENTS

| | | | |
|---|---|---|---|
| 5,532,716 A * | 7/1996 | Sano | 345/698 |
| 7,015,919 B1 | 3/2006 | Stauffer et al. | |
| 7,302,648 B1 | 11/2007 | Brunner et al. | |
| 7,675,529 B1 | 3/2010 | Brunner et al. | |
| 2003/0222895 A1 * | 12/2003 | Arai | 345/698 |
| 2004/0075623 A1 * | 4/2004 | Hartman | 345/1.3 |
| 2004/0223058 A1 * | 11/2004 | Richter et al. | 348/207.1 |
| 2006/0009286 A1 * | 1/2006 | Durham et al. | 463/30 |
| 2006/0050090 A1 * | 3/2006 | Ahmed et al. | 345/660 |
| 2007/0025644 A1 * | 2/2007 | Wang et al. | 382/300 |

* cited by examiner

*Primary Examiner* — Allison W Johnson
(74) *Attorney, Agent, or Firm* — Blakely, Sokoloff, Taylor & Zafman LLP

(57) ABSTRACT

Methods and apparatuses for per display scale factors within a multiple display system are described.

In one aspect of the invention, a machine implemented method includes setting a scale factor for each window buffer equal to an extreme scale factor among a plurality of displays. The method further includes transferring data from each window buffer into a corresponding frame buffer for one of the plurality of displays by setting a scale factor of each frame buffer equal to the scale factor of the corresponding display. In one example according to this aspect, the method further includes displaying on a high resolution display and a low resolution display an image, stored in the corresponding frame buffers, with substantially the same physical size even though the displays have different scale factors and pixel densities. Also, the extreme scale factor is one of the largest scale factor or the smallest scale factor.

13 Claims, 10 Drawing Sheets

METHODS AND APPARATUSES FOR CONTROLLING DISPLAY DEVICES

FIELD OF THE INVENTION

The invention relates to methods and apparatuses for controlling display devices.

BACKGROUND OF THE INVENTION

Typical graphical user interfaces are designed for display devices of standard resolutions. Until recently a "high resolution" display device typically had a large number of pixels on a large display area, when compared to a standard resolution display device. Thus, most display devices have similar numbers of pixels in a given size of a display area. However, recent developments in display devices, especially in high resolution LCD display panels, allow significantly more pixels to be displayed on an area of a fixed size. The pixel size of a high resolution display device is typically smaller than the pixel size of a low resolution display device.

A graphical user interface environment may include drawing and moving windows on a display device and interacting with a mouse, other cursor control devices, and/or a keyboard. In a buffered window system, application software draws contents in the window buffers. The window system transfers the images buffered in the window buffers to frame buffers to display the corresponding windows on the display screen.

A typical display system with a high resolution display and a low resolution display can be used to display the same window on each display. The pixel size of the high resolution display device is smaller than the pixel size of the low resolution display device. If the area of the high resolution display is similar or less than the area of the low resolution display device, then the contents of a window such as an image (e.g., an icon or a button on a window or menu of buttons) will be much smaller on the high resolution display device compared to the low resolution display device. The dimensions of the image of the high resolution display device are much smaller than the dimensions of the image of the low resolution display device. Thus, the high resolution device can display more pixels on the same area than the low resolution device. The image designed for the low resolution device appears much smaller when displayed on the high resolution devices.

Graphical user interface (GUI) components are typically designed in the unit of pixels. Thus, when the GUI components designed for a low resolution device is displayed on a high resolution device, the GUI components may appear too small to be comfortable for a user. It is often desirable to scale up the GUI components so that a user can comfortably interact with the GUI components displayed on the high resolution display device.

For example, a multiple display system may include a laptop with a scale factor set at 200 dots per inch (dpi) screen resolution and a external display with a scale factor set at 100 dpi screen resolution. A prior implementation would set the scale factor of the laptop and external display both to 200 dpi or alternatively both set to a scale factor of 100 dpi. Setting both scale factors to 200 dpi would result in increasing the image displayed on the external display beyond the size of the screen, thus defeating the purpose of the external display. Setting both scale factors to 100 dpi would make the laptop nearly unusable because the image displayed on the laptop would be too small to effectively view.

SUMMARY OF THE DESCRIPTION

Methods and apparatuses for controlling a data processing system having multiple displays with different scale factors (e.g., different pixel resolutions) are described here.

In one aspect of the invention, a machine implemented method includes setting a scale factor for each window buffer equal to an extreme scale factor among a plurality of displays; and transferring data from each window buffer into a corresponding frame buffer for one of the plurality of displays by setting a scale factor of each frame buffer equal to the scale factor of the corresponding display.

In one example according to this aspect, the method further includes displaying on a high resolution display and a low resolution display an image, stored in the corresponding frame buffers, with substantially the same physical size even though the displays have different scale factors and pixel densities. In an implementation, the scale factor is an extreme scale factor. The extreme scale factor is one of the largest scale factor or the smallest scale factor.

In another aspect of the invention, a machine implemented method in a data processing system having a window buffer for each window being displayed on display devices includes setting a scale factor for each window buffer equal to a selected scale factor among a plurality of displays having a plurality of scale factors. In one embodiment, the selected scale factor may be predetermined. The method further includes transferring data from each window buffer into a corresponding frame buffer for one of the plurality of displays by setting a scale factor of each frame buffer equal to the scale factor of the corresponding display.

In another aspect of the invention, a machine implemented method in a data processing system having a window buffer for each window being displayed on display devices includes setting a scale factor for each window buffer and corresponding frame buffer equal to a selected scale factor among a plurality of displays having a plurality of scale factors. In one embodiment, the selected scale factor may be predetermined. The method further includes transferring data from each frame buffer onto the corresponding display according to the scale factor of the corresponding display by executing a task, on each screen refresh interval, which converts from the scale factor in the corresponding frame buffer to the scale factor of the corresponding display.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
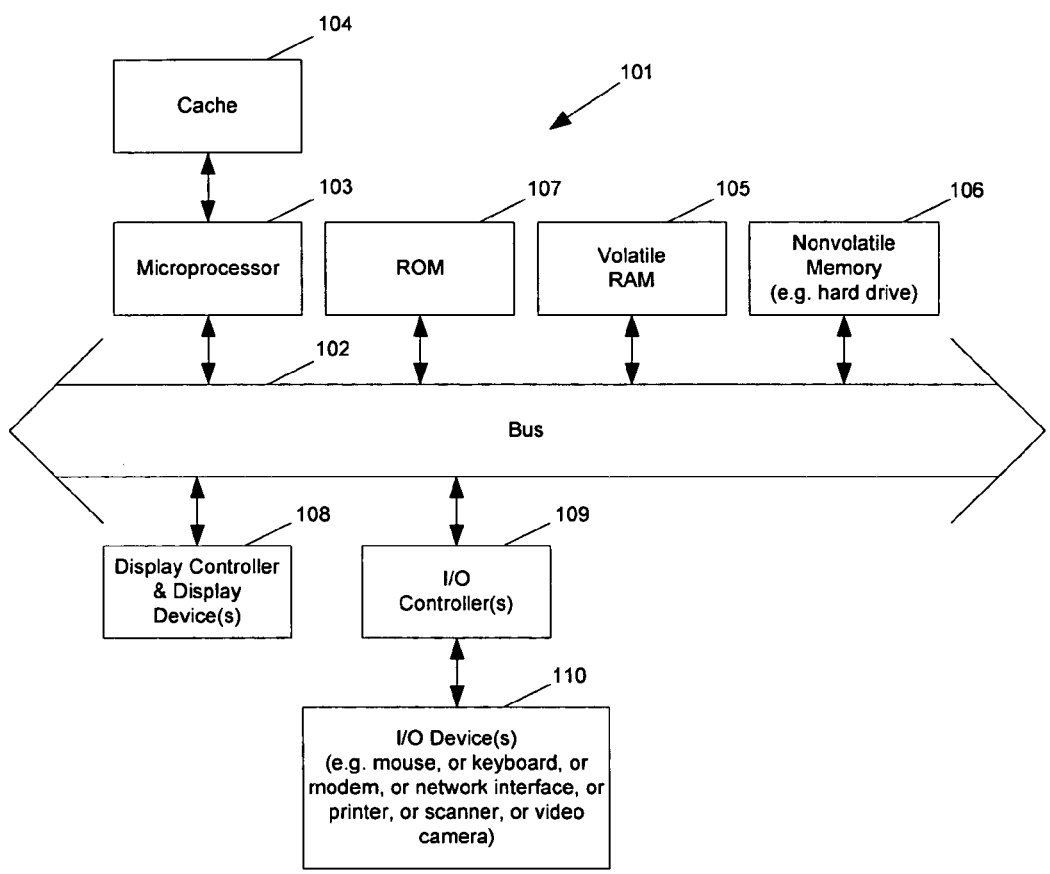
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that personal digital assistants (PDAs), handheld computers, cellular telephones, media players (e.g., an ipod), devices which combine aspects or functions of these devices (e.g., a media player combined with a PDS and a cellular telephone in one device), an embedded processing device within another device, network computers and other data processing systems which have fewer components or perhaps more components may also be used to implement one or more embodiments of the present inventions. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a microprocessor from Intel or a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device(s) 108, which may include display devices and corresponding frame buffers, and to peripheral devices such as input/output (I/O) devices which may be mice, keyboards, modems, network interfaces, printers, scanners, video cameras and other devices which are well known in the art. The display controller 108 may include one or more frame buffers which are used to refresh multiple display devices or the frame buffers may be in a system RAM (e.g., RAM 105). Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present invention seeks to optimize scale factors on a per display device basis within a multiple display device system having different scale factors between display devices. Scale factors are optimized for each display device according to the resolution of the particular display device in order to obtain optimum viewing and operation of each window being displayed on the display device within the multiple display device system.

Figure 2:
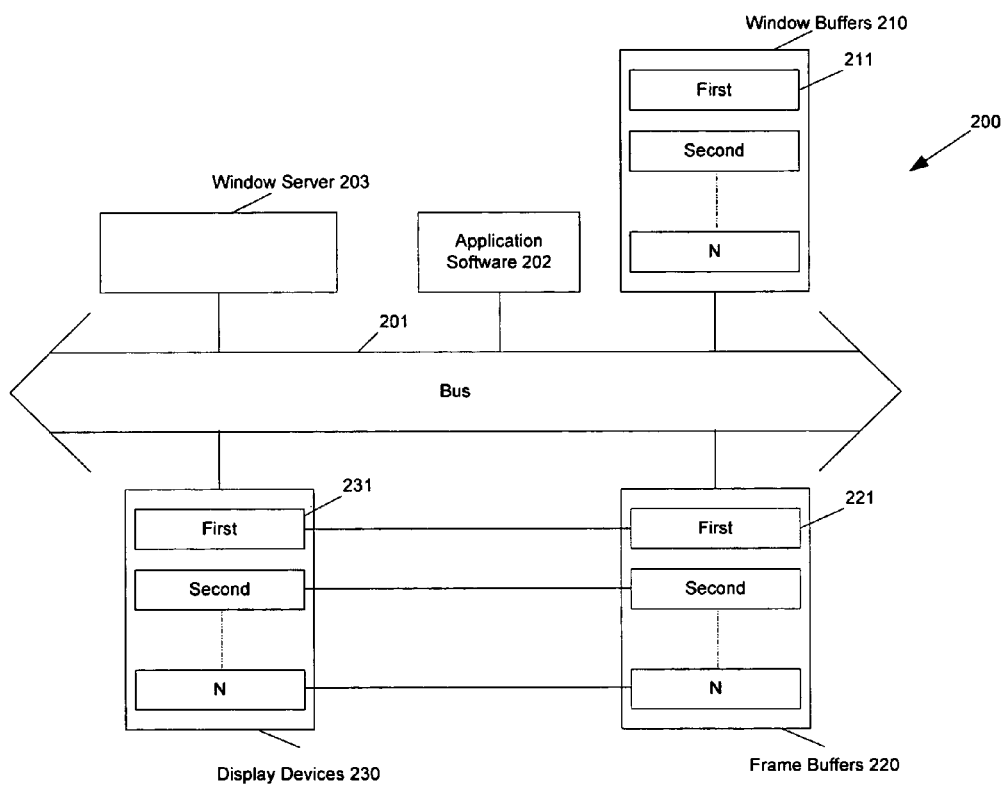
FIG. 2 shows a block diagram example of a window buffering system according to one embodiment of the present invention.

FIG. 2 shows a block diagram example of a window buffering system according to one embodiment of the present invention. The window buffering system 200 includes a bus 201, application software 202, window server 203, window buffers 210, frame buffers 220, and corresponding display devices 230. The window buffering system 200 is an example implementation of the data processing system 100. Application software 202 draws contents in the window buffers 210 and the window server 203 transfers the images buffered in window buffers 210 into frame buffers 220 to display the corresponding windows on the display devices 230. The window server 203 operates within an operating system environment.

For example, application software 202 draws contents in a first window buffer 211, which is typically allocated from system memory (e.g., volatile RAM 105 in FIG. 1). When the size of the window is changed, a new window buffer is allocated to replace the old one in order to accommodate the window of the new size. A first frame buffer 221 contains data for the screen image of the first window buffer 211 that are displayed on the screen of a first display device 231. When the window corresponding to the first window buffer 211 is moved on the screen of the first display device 231, the content in the window is not changed; and the application software does not have to update the first window buffer 211. The window server 203 copies the data in the first window buffer 211 to the correct position in the first frame buffer 221 to display the window in the new location on the screen of the first display device 231. When the window is partially covered by other windows, a portion of data in the first window buffer 211 is copied onto the first frame buffer 221 to display the corresponding portion of the window that is visible. Frame buffers 220 are typically under control of graphics hardware (e.g., graphics/video card) which controls the display of the windows on the screen of display devices 230 using the data in the frame buffers 220.

In one embodiment of a window buffering system 200, a plurality of window buffers 210 are coupled to a plurality of frame buffers 220. Each frame buffer is coupled to one of a plurality of display devices 230 that each has a scale factor different than the other displays because each display device has a different resolution or pixel density, pixels per inch. A window server 203 is coupled to the plurality of window buffers 210 and the plurality of frame buffers 220. The window server 203 is configured, in one exemplary embodiment, to set the scale factor for each window buffer equal to the largest scale factor among the plurality of display devices 230. The window server 203 transfers, in one exemplary embodiment, data from each window buffer into the corresponding frame buffer for one of the display devices by setting the scale factor of each frame buffer equal to the scale factor of the corresponding display device.

Each display device of the plurality of display devices 230 can display a different window or windows compared to the other display devices. Alternatively, each display device of the plurality of display devices 230 can display the same window having the same image, stored in the corresponding frame buffers 220. The image displayed on the plurality of display devices 230 has substantially the same physical size even though the displays have different scale factors and pixel densities.

Figure 3:
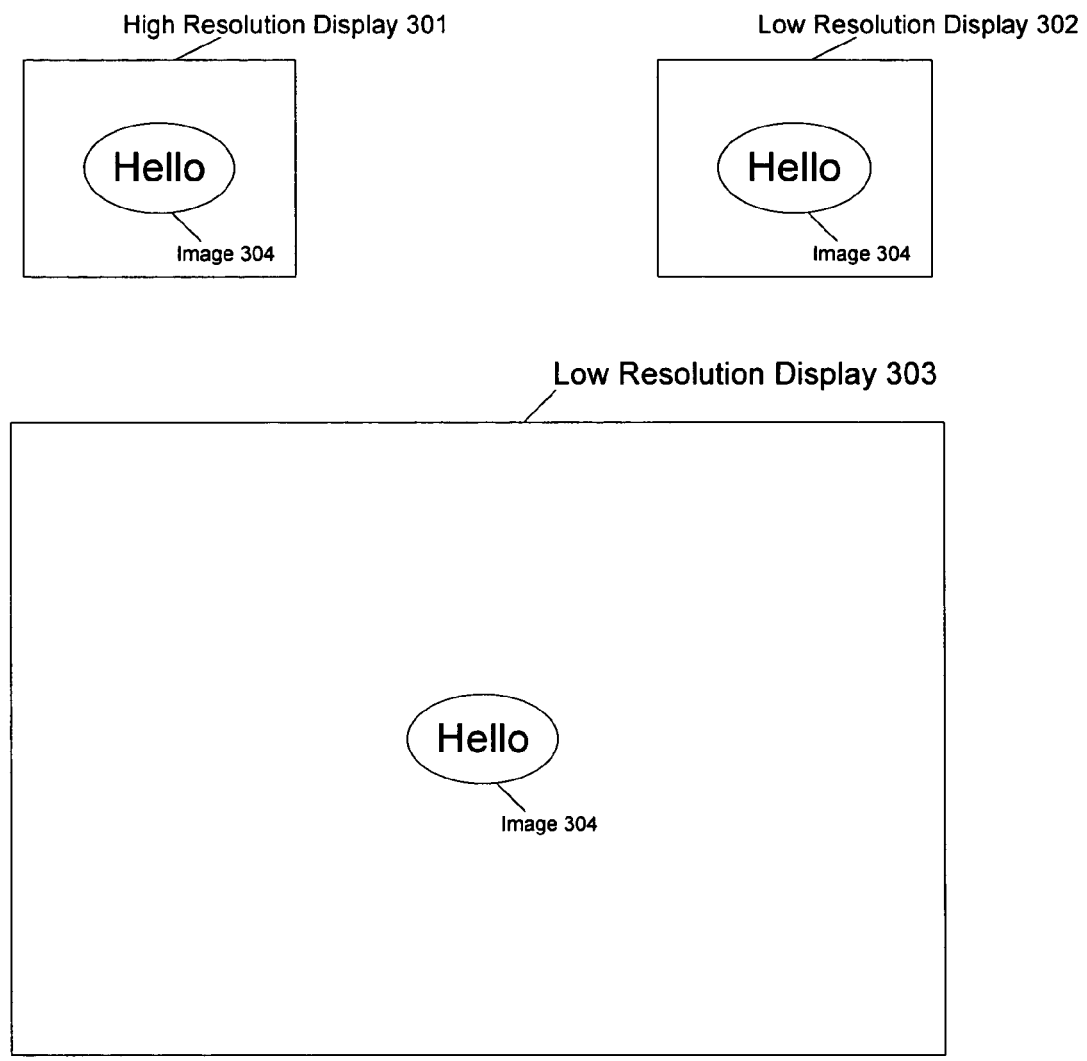
FIG. 3 shows multiple displays of a window buffering system that each displays the same image according to one embodiment of the present invention.

For example, FIG. 3 shows multiple displays of a window buffering system that each displays the same image according to one embodiment of the present invention. The displays are a high resolution display 301, a low resolution display 302, and a low resolution display 303 that each display an image, stored in the corresponding frame buffers, with substantially the same physical size even though the displays have different scale factors and pixel densities.

In an embodiment, high resolution display 301 and low resolution display 302 may each have the same size display screen. Each of these displays is able to display image 304 with substantially the same physical size (e.g., the "hello" image on display 301 is about 1" long and the "hello" image on display 302 is about 1" long or about 80% to 120% of the length of "hello" on display 301) even though the displays 301 and 302 have significantly different scale factors and pixel densities. "Substantially the same physical size" is being defined as having the size of the smallest image displayed on a display device being 80 to 120 percent the size of the largest image displayed on the other display device(s). A user can effectively view and operate a window buffering system, which is a multiple display system with multiple display devices, having significantly different scale factors between the display devices based on the images displayed being substantially the same physical size for all display devices.

In an embodiment, high resolution display 301 and low resolution display 303 have significantly different display screen sizes, pixel densities, and scale factors. However, each of these displays is able to display image 304 with substantially the same physical size even though the displays 301 and 303 have significantly different scale factors and pixel densities. A user can effectively view and operate a multiple display system having significantly different scale factors between the displays based on the images displayed being substantially the same physical size.

Figure 4:
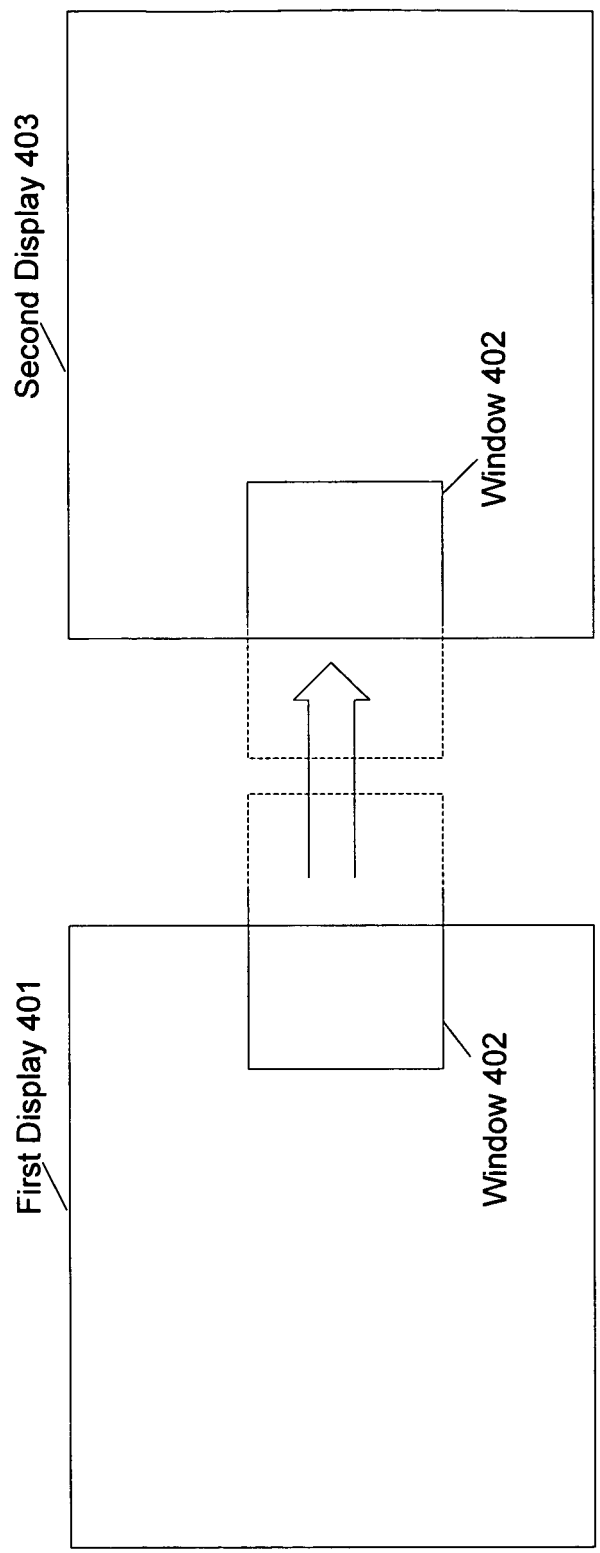
FIG. 4 shows moving a window from a first display to a second display according to one embodiment of the present invention.

FIG. 4 shows moving a window from a first display to a second display according to one embodiment of the present invention. In this embodiment, the window buffering system 200 includes at least one window buffer coupled to a plurality of frame buffers 220. Each frame buffer is coupled to one of a plurality of display devices 230 each having a scale factor different than the other displays. The window server 203 is coupled to the at least one window buffer and the plurality of frame buffers 220. A user input such as a mouse cursor movement or keystroke represents a command to move a window 402 from a first display 401 with a first scale factor to a second display 403 with a second scale factor.

The window server 203 is configured such that if the first scale factor does not equal the second scale factor, then the window server 203 tears down the first window buffer, rebuilds the first window buffer, sets the first window buffer equal to the scale factor of the second display 403, transfers data from the first window buffer into the frame buffer corresponding to the second display 403, and displays the window 401 on the second display 403. However, if the first scale factor equals the second scale factor, then the window server 203 displays the window 401 on the second display 403 with no change in scale factor for the window 401.

For example, the first display 401 can be a high resolution display and the second display 403 can be a low resolution display with significantly lower pixel density compared to the high resolution display 401. Each display non-contemporaneously, at different times, displays the window 402 with substantially the same physical size even though the displays have different scale factors and pixel densities.

The window server 203 can be easily implemented with this embodiment. The window buffers 210 take up the necessary amount of memory for storing the window one display at a time, rather than having multiple window buffers to support the window for multiple displays.

In one embodiment of a window buffering system, at least one window buffer is coupled to at least one frame buffer, which is coupled to a plurality of display devices 230 each having a scale factor different than the other displays. A window server 203 is coupled to the at least one window buffer and the at least one frame buffer. The window server 203 is configured in a mode to set the scale factor for each window buffer and corresponding frame buffer equal to the largest scale factor among the plurality of displays. Next, a screen refresh task transfers data from each frame buffer onto the corresponding display device according to the scale factor of the corresponding display device. The screen refresh task is executed during the screen refresh interval and refreshes the entire display device screen.

Anti-aliasing may be necessary if the screen refresh task is converting the largest scale factor in the frame buffer corresponding to a high resolution display to match the scale factor of a low resolution display device. Anti-aliasing is the technique of minimizing aliasing (jagged or blocky patterns) when representing a high resolution signal at a lower resolution.

Figure 5:
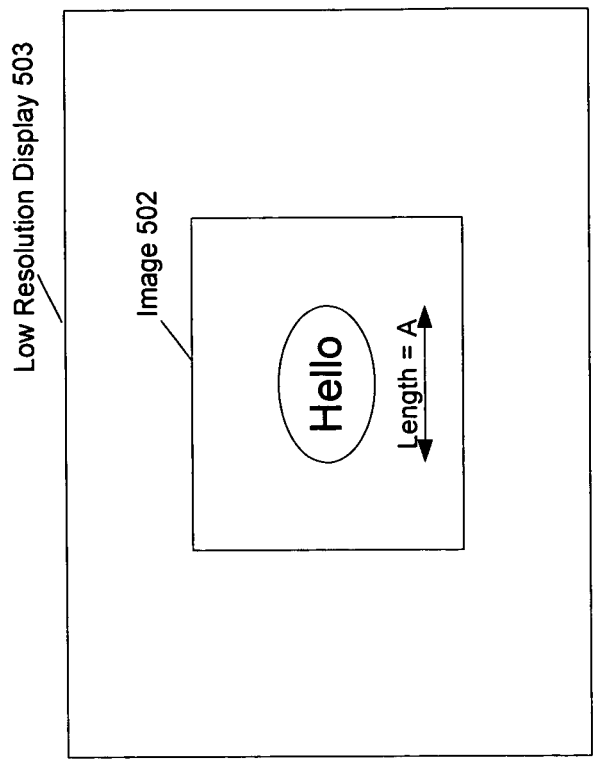
FIG. 5 shows a high resolution display and low resolution display each displaying the same image according to one embodiment of the present invention.
Figure 5:
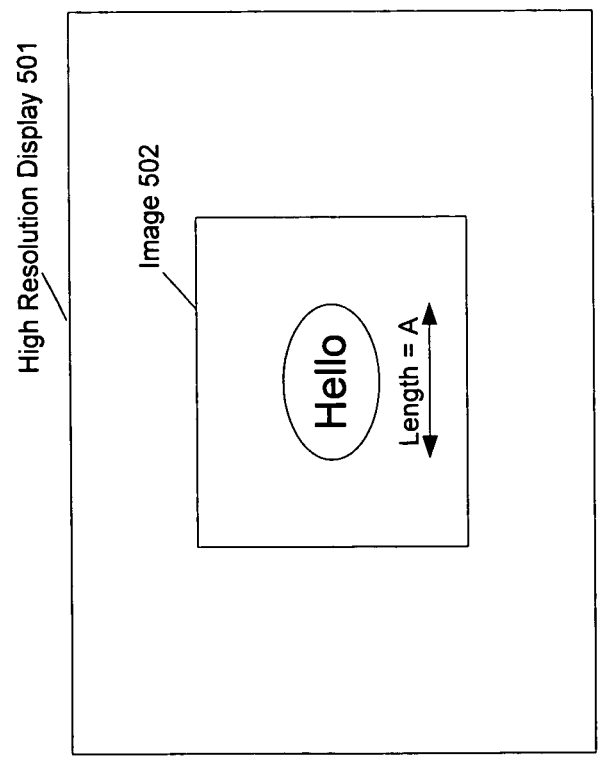

For example, FIG. 5 shows a high resolution display and low resolution display each displaying the same image. The high resolution display 501 and the low resolution display 501 have significantly different pixel densities and scale factors, but the same physical dimensions. Each display device displays the same image 502, stored in the corresponding frame buffers, with the same physical size, length A, even though the displays have different scale factors and pixel densities.

FIGS. 6-9 show various methods for scaling a window per each display within a multiple display system such as the data processing system 100.

Figure 6:
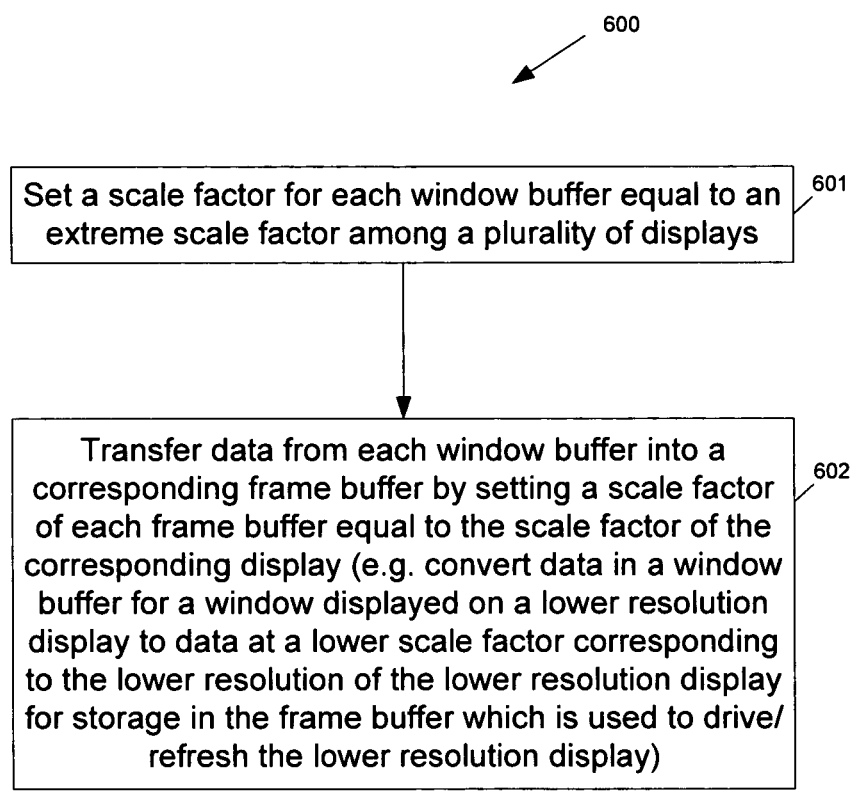
FIG. 6 shows a flow chart for a method to scale a window on multiple displays according to one embodiment of the present invention.

FIG. 6 shows a flow chart for a machine implemented method to scale a window on multiple displays according to one embodiment of the present invention. A machine implemented method 600 includes setting a scale factor for each window buffer equal to an extreme scale factor among a plurality of display devices at block 601. The machine implemented method 600 further includes transferring data from each window buffer into a corresponding frame buffer for one of the plurality of display devices by setting a scale factor of each frame buffer equal to the scale factor of the corresponding display at block 602. The extreme scale factor is one of the largest scale factor or the smallest scale factor. The extreme scale factor corresponding to the highest resolution display is the largest scale factor. The scale factor for each window buffer is set to the largest scale factor to obtain optimum resolution in the highest resolution display.

For an example embodiment, the method 600 converts data in a window buffer for a window displayed on a lower resolution display to data corresponding to the lower resolution of the lower resolution display at a lower scale factor for storage in the frame buffer which is used to drive/refresh the lower resolution display at block 602. The method 600 does not need to convert data in a window buffer for a window displayed on a highest resolution display because the scale factor for this display has already been set to the extreme scale factor corresponding to the highest resolution display at block 601.

In one embodiment of a scaled mode, the method 600 further includes displaying on a high resolution display and a low resolution display an image, stored in the corresponding frame buffers, with substantially the same physical size even though the displays have different scale factors and pixel densities. A user can view and operate both high and low resolution displays with optimal resolution and minimal image distortion in accordance with method 600.

In one embodiment of a non-scaled mode, the method 600 further includes setting the scale factor for each window buffer equal to 1.0 which represents a 1:1 ratio between window buffer pixel density and a corresponding display screen pixel density. The method 600 further includes transferring data from each window buffer into the corresponding frame buffer. The non-scaled mode is useful for certain software applications that already perform a scaling transformation or other compensation in switching from one display to another display with each display having different scale factors.

Figure 7:
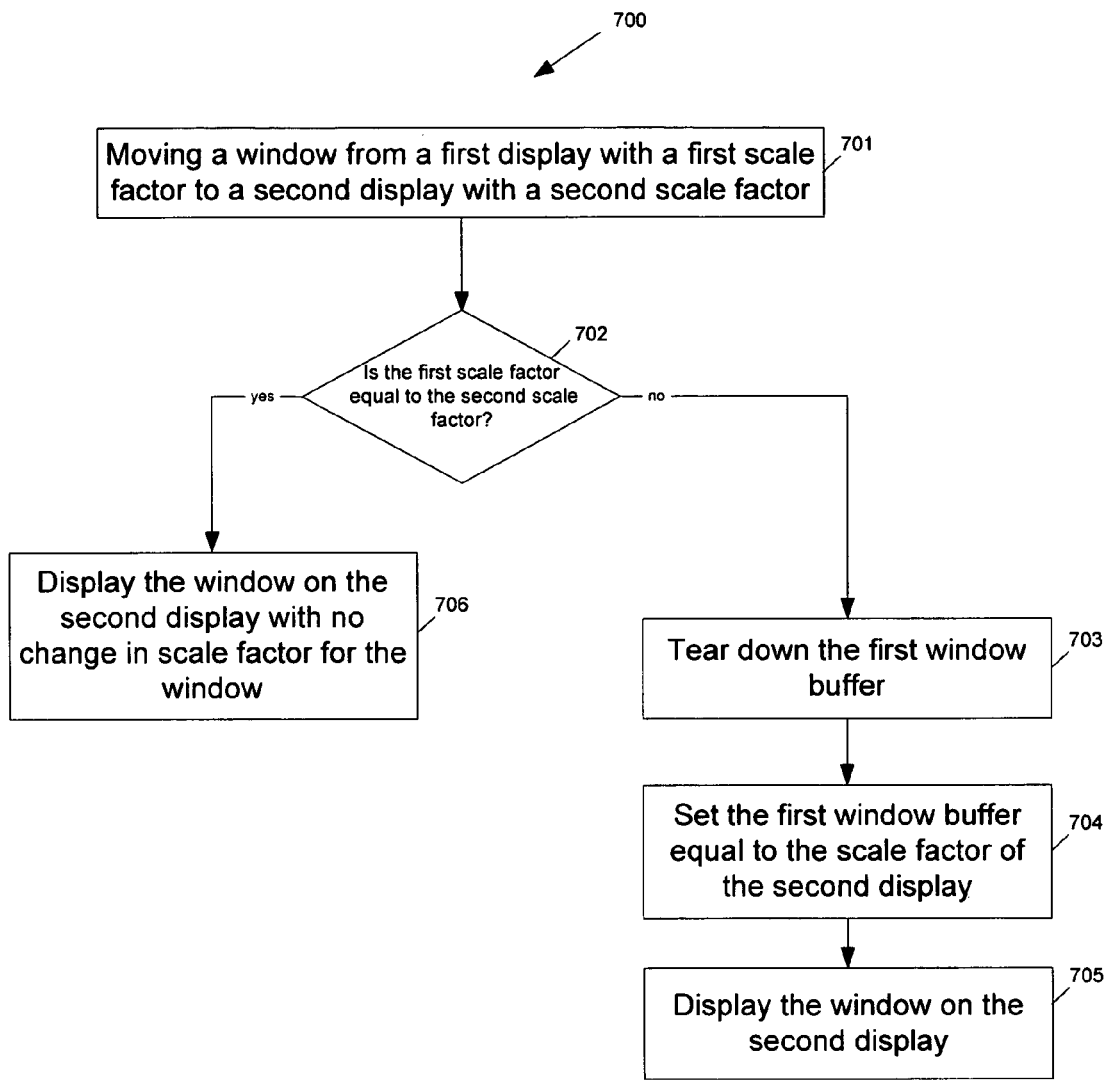
FIG. 7 shows a flow chart for a method to scale a window on multiple displays according to one embodiment of the present invention.

FIG. 7 shows a flow chart for a machine implemented method to scale a window on multiple displays according to one embodiment of the present invention. A machine implemented method 700 includes receiving an input indicating a moving of a window from a first display with a first scale factor to a second display with a second scale factor at block 701. The method 700 further includes determining if the first scale factor equals the second scale factor at decision block 702. Rebuilding of a window buffer occurs at block 703 if the first scale factor does not equal the second scale factor. Rebuilding occurs by tearing down the window buffer at block 703, setting the window buffer equal to the scale factor of the second display at block 704, and displaying the window on the second display at block 704. In one implementation, rebuilding of the window buffer includes redrawing the window's contents into the window buffer using the scale factor of the second display. Rebuilding the window buffer can occur when moving the window to the second display is temporarily delayed. Alternatively, rebuilding the window buffer can occur when moving the window to the second display is 50 percent to 100 percent completed.

If the first scale factor equals the second scale factor at block 702, then the method 700 further includes displaying the window on the second display with no change in scale factor and no rebuilding of the window at block 706.

In one embodiment of the method 700, the first display is a high resolution display, the second display is a low resolution display, and each non-contemporaneously, at different times, displays the window with substantially the same physical size even though the displays have different scale factors and pixel densities. The first display continues to display the window until the rebuilding occurs at which point the second display starts to display the window. A user can view and operate both high and low resolution displays with optimal resolution and minimal image distortion in accordance with method 700.

Figure 8:
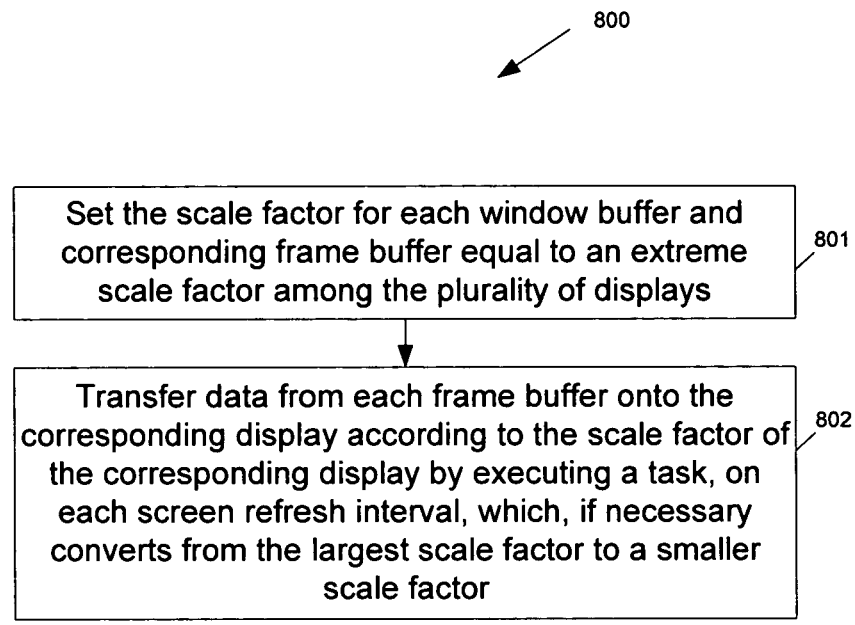
FIG. 8 shows a flow chart for a method to scale a window on multiple displays according to one embodiment of the present invention.

FIG. 8 shows a flow chart for a machine implemented method to scale a window on multiple displays according to one embodiment of the present invention. A machine implemented method 800 includes setting the scale factor for each window buffer and corresponding frame buffer equal to an extreme scale factor among a plurality of displays at block 801. The method 800 further includes transferring data from each frame buffer onto the corresponding display according to the scale factor of the corresponding display by executing a task, on each screen refresh interval, which converts from the scale factor in the corresponding frame buffer to the scale factor of the corresponding display at block 802. If the scale factor stored in the frame buffer equals the scale factor of the corresponding display, then no conversion of the scale factor is necessary.

The extreme scale factor is one of the largest scale factor or the smallest scale factor. The extreme scale factor corresponding to the highest resolution display is the largest scale factor. The scale factor for each window buffer is set to the largest scale factor to obtain optimum resolution in the highest resolution display.

In one embodiment of a scaled mode, the method 800 further includes displaying on a high resolution display and a low resolution display an image, stored in the corresponding frame buffers, with substantially the same physical size even though the displays have different scale factors and pixel densities. A user can view and operate both high and low resolution displays with optimal resolution and minimal image distortion in accordance with method 800.

Figure 9:
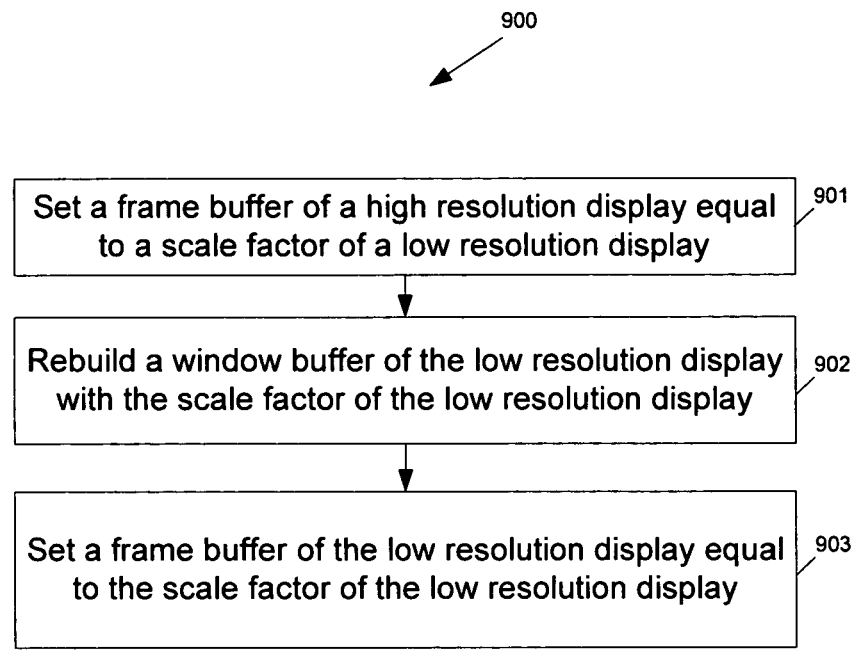
FIG. 9 shows a flow chart for a method to scale a window on multiple displays according to one embodiment of the present invention.

FIG. 9 shows a flow chart for a machine implemented method to scale a window on multiple displays according to one embodiment of the present invention. The method 900 is adaptable for use with other scaled mode implementations and can be used during a scaled projector mode having displays with different dimensions and scale factors. The method 900 includes setting a window buffer of a high resolution display equal to the scale factor of the high resolution display, if necessary. The window buffer of the high resolution display may have previously been set to the scale factor of the high resolution display. The method 900 further includes setting the frame buffer of the high resolution display equal to the scale factor of a low resolution display at block 901. The method 900 further includes rebuilding the window buffer of the low resolution display with the scale factor of the low resolution display at block 902. The method further includes setting the frame buffer of the low resolution display equal to the scale factor of the low resolution display.

Thus, the high resolution display with a window buffer set equal to the scale factor of the high resolution display is displayed with the scale factor corresponding to the low resolution display.

Figure 10:
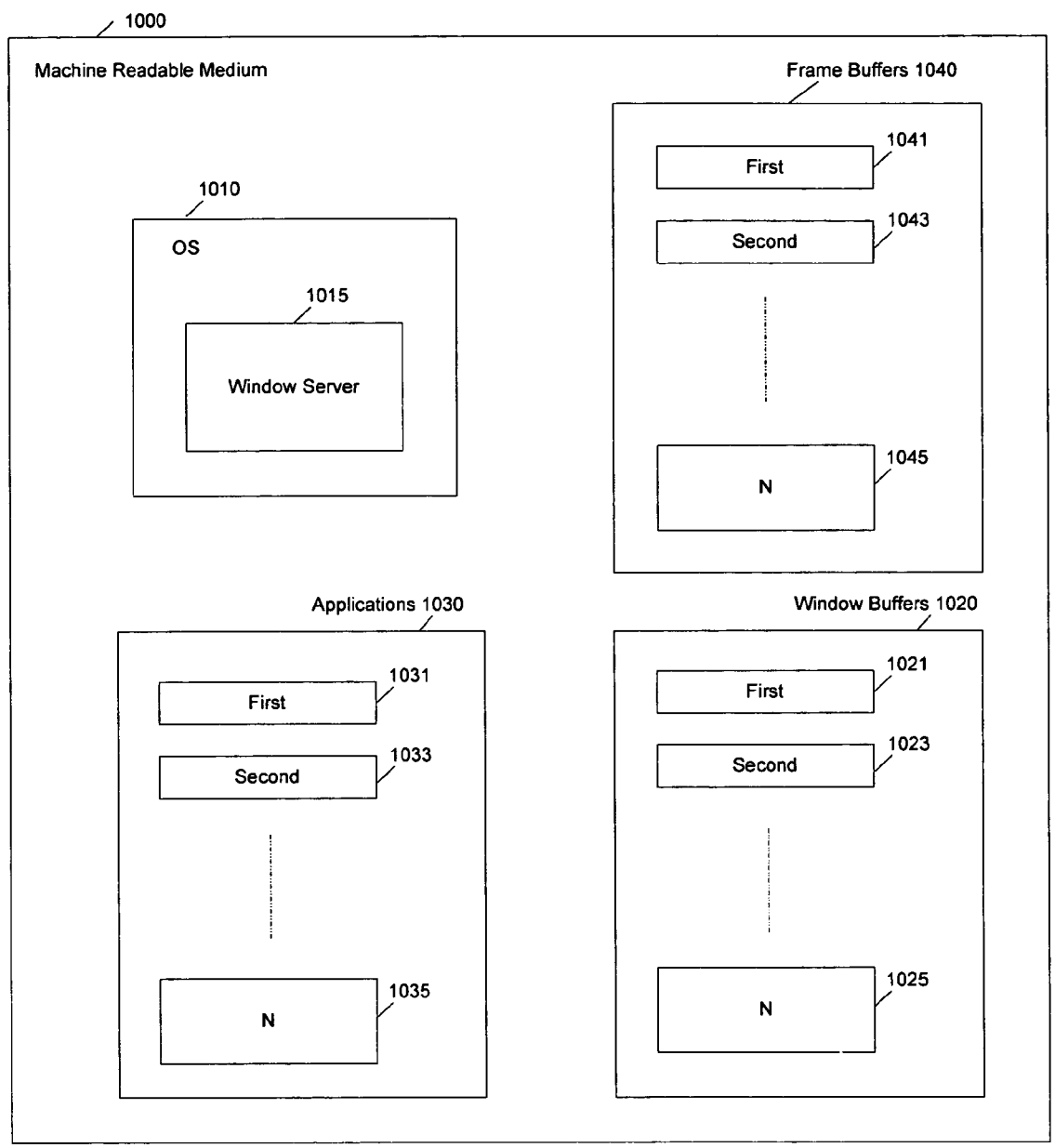
FIG. 10 shows an example of a machine readable media, which may be used to store software and data which when executed by a data processing system causes the system to perform various methods of the present invention.

FIG. 10 shows an example of a machine readable media, which may be used to store software and data which when executed by a data processing system causes the system to perform various methods of the present invention. As noted above, this executable software and data may be stored in various places including for example ROM 107, volatile RAM 105, non-volatile memory 106 and/or cache 104 as shown in FIG. 1. Portions of this software and/or data may be stored in any one of these storage devices. Media 1000 for example may be primarily volatile RAM 105 and non-volatile memory 106 in one embodiment. OS 1010 represents an operating system. Window server 1015 represents a window managing system, which is typically a part of OS 1010. Applications 1031-1035 represent application software, which display contents in corresponding windows on the system. Window buffers 1021-1025 represent the data for the images of the windows drawn by applications 1031-1035, respectively. Frame buffers 1041-1045 represents the data for the screen image to be displayed on multiple display devices. Window buffers 1020 may be primarily on volatile RAM 105, or primarily on video memory (e.g., in display controller 108). Frame buffers 1040 may be primarily on video memory in display controller 108, or primarily on volatile RAM 105.

Using the methods of various embodiments of the present invention, scale factors for window buffers and/or frame buffers are set per each display with data being transferred from window buffers to corresponding frame buffers in a multiple display system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method, comprising:
setting scale factors for first and second window buffers associated with first and second displays equal to a largest scale factor among the first and second displays, wherein the first and second window buffers are allocated from system memory for application software to draw contents in the first and second window buffers;
transferring data from the first and second window buffers into first and second frame buffers by setting scale factors of the first and second frame buffers equal to the scale factors of the first and second displays, wherein each scale factor indicates a pixel density; and
displaying on a high resolution display and a low resolution display an image, stored in the corresponding frame buffers, with substantially the same physical size even though the displays have different scale factors and pixel densities, wherein the displays have approximately the same display size, wherein the first display is the high resolution display and the second display is the low resolution display.

2. The method of claim 1, wherein transferring data from the first and second window buffers into first and second frame buffers further comprises:
converting data in the window buffer of the low resolution display to data corresponding to the scale factor of the low resolution display; and
setting the scale factor of the frame buffer of the low resolution display equal to the scale factor of the low resolution display.

3. The method of claim 1, further comprising:
configuring a window server in a non-scaled mode;
setting the scale factor for each window buffer equal to 1.0 which represents a 1:1 ratio between window buffer pixel density and a corresponding display screen pixel density; and
transferring data from each window buffer into the corresponding frame buffer.

4. A machine-readable non-transitory medium having executable instructions to cause a machine to perform a method comprising:
setting scale factors for first and second window buffers associated with first and second displays equal to a largest scale factor among the first and second displays, wherein the first and second window buffers are allocated from system memory for application software to draw contents in the first and second window buffers;
transferring data from the first and second window buffers into first and second frame buffers by setting scale factors of the first and second frame buffers equal to the scale factors of the first and second displays, wherein each scale factor indicates a pixel density; and
displaying on a high resolution display and a low resolution display an image, stored in the corresponding frame buffers, with substantially the same physical size even though the displays have different scale factors and pixel densities, wherein the displays have approximately the same display size, wherein the first display is the high resolution display and the second display is the low resolution display.

5. The machine-readable non-transitory medium of claim 4, wherein the method further comprises:
configuring a window server in a non-scaled mode;
setting the scale factor for each window buffer equal to 1.0 which represents a 1:1 ratio between window buffer pixel density and a corresponding display screen pixel density; and
transferring data from each window buffer into the corresponding frame buffer.

6. A machine implemented method, comprising:
setting scale factors for first and second window buffers associated with first and second displays and first and second frame buffers equal to an extreme scale factor among the first and second displays, wherein the first and second window buffers are allocated from system memory for application software to draw contents in the first and second window buffers; and
transferring data from each frame buffer onto the corresponding display according to the scale factor of the corresponding display by executing a task, on each screen refresh interval, which converts from the scale factor in the corresponding frame buffer to the scale factor of the corresponding display, wherein each scale factor indicates a pixel density, wherein the transferring of data from each frame buffer onto the corresponding display also displays an image, stored in corresponding frame buffers, with substantially the same physical size even though the displays have different scale factors and pixel densities, and wherein the extreme scale factor is one of the largest scale factor or the smallest scale factor.

7. The method of claim 6, further comprising:
setting the scale factor of the frame buffer of a high resolution display equal to the scale factor of a low resolution display;

rebuilding the window buffer of the low resolution display with the scale factor of the low resolution display; and setting the scale factor of the frame buffer of the low resolution display equal to the scale factor of the low resolution display.

8. A machine-readable non-transitory medium having executable instructions to cause the machine to perform a method comprising:

setting scale factors for first and second window buffers associated with first and second displays and first and second frame buffers equal to an extreme scale factor among the first and second displays, wherein the first and second window buffers are allocated from system memory for application software to draw contents in the first and second window buffers; and transferring data from each frame buffer onto the corresponding display according to the scale factor of the corresponding display by executing a task, on each screen refresh interval, which converts from the scale factor in the corresponding frame buffer to the scale factor of the corresponding display, wherein each scale factor indicates a pixel density, wherein the transferring of data from each frame buffer onto the corresponding display also displays an image, stored in corresponding frame buffers, with substantially the same physical size even though the displays have different scale factors and pixel densities, and wherein the extreme scale factor is one of the largest scale factor or the smallest scale factor.

9. The machine-readable non-transitory medium of claim 8, wherein the method further comprises:

setting the scale factor of the frame buffer of a high resolution display equal to the scale factor of a low resolution display;

rebuilding the window buffer of the low resolution display with the scale factor of the low resolution display; and setting the scale factor of the frame buffer of the low resolution display equal to the scale factor of the low resolution display.

10. A machine implemented method in a data processing system having a window buffer for each window being displayed on display devices, the method, comprising:

setting scale factors for first and second window buffers associated with first and second display devices equal to a selected scale factor among the first and second display devices having different scale factors, wherein the first and second window buffers are allocated from system memory for application software to draw contents in the first and second window buffers;

transferring data from the first and second window buffers into first and second frame buffers by setting scale factors of the first and second frame buffers equal to the scale factors of the first and second displays, wherein each scale factor indicates a pixel density; and displaying on a high resolution display and a low resolution display an image, stored in the corresponding frame buffers, with substantially the same physical size even though the displays have different scale factors and pixel densities, wherein the displays have approximately the same display size, wherein the first display device includes the high resolution display and the second display device includes the low resolution display.

11. A machine-readable non-transitory medium having executable instructions to cause a machine to perform a method comprising:

setting scale factors for first and second window buffers associated with first and second display devices equal to a selected scale factor among the first and second display devices having different scale factors, wherein the first and second window buffers are allocated from system memory for application software to draw contents in the first and second window buffers;

transferring data from the first and second window buffers into first and second frame buffers by setting scale factors of the first and second frame buffers equal to the scale factors of the first and second displays, wherein each scale factor indicates a pixel density; and displaying on a high resolution display and a low resolution display an image, stored in the corresponding frame buffers, with substantially the same physical size even though the displays have different scale factors and pixel densities, wherein the displays have approximately the same display size, wherein the first display device includes the high resolution display and the second display device includes the low resolution display.

12. A machine implemented method in a data processing system having a window buffer for each window being displayed on display devices, the method, comprising:

setting scale factors for first and second window buffers associated with first and second displays and first and second frame buffers equal to a selected scale factor among the first and second displays having different scale factors, wherein the first and second window buffers are allocated from system memory for application software to draw contents in the first and second window buffers; and transferring data from each frame buffer onto the corresponding display according to the scale factor of the corresponding display by executing a task, on each screen refresh interval, which converts from the scale factor in the corresponding frame buffer to the scale factor of the corresponding display, wherein each scale factor indicates a pixel density, wherein the transferring of data from each frame buffer onto the corresponding display also displays an image, stored in corresponding frame buffers, with substantially the same physical size even though the displays have different scale factors and pixel densities, and wherein the selected scale factor is one of the largest scale factor or the smallest scale factor.

13. A machine-readable non-transitory medium having executable instructions to cause a machine to perform a method comprising:

setting scale factors for first and second window buffers associated with first and second displays and first and second frame buffers equal to a selected scale factor among the first and second displays having different scale factors, wherein the first and second window buffers are allocated from system memory for application software to draw contents in the first and second window buffers; and transferring data from each frame buffer onto the corresponding display according to the scale factor of the corresponding display by executing a task, on each screen refresh interval, which converts from the scale factor in the corresponding frame buffer to the scale factor of the corresponding display, wherein each scale factor indicates a pixel density, wherein the transferring of data from each frame buffer onto the corresponding display also displays an image, stored in corresponding frame buffers, with substantially the same physical size even though the displays have different scale factors and pixel densities, and wherein the selected scale factor is one of the largest scale factor or the smallest scale factor.

* * * * *